United States Patent
Popovski et al.

(10) Patent No.: US 11,088,415 B2
(45) Date of Patent: Aug. 10, 2021

(54) BATTERY STRUCTURE COMPRISING TRAY AND CROSS MEMBERS

(71) Applicant: Ford Global Technologies, LLC, Dearborn, MI (US)

(72) Inventors: Mike Popovski, Warren, MI (US); Ihab Grace, Grosse Pointe Woods, MI (US); Abigail Christensen, Canton, MI (US); Saravanan Paramasivam, South Lyon, MI (US); Anil Reddy Pullalarevu, Northville, MI (US); Michael William Danyo, Trenton, MI (US); John Jardine, Harrison Township, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 78 days.

(21) Appl. No.: 16/574,401

(22) Filed: Sep. 18, 2019

(65) Prior Publication Data
US 2021/0083240 A1    Mar. 18, 2021

(51) Int. Cl.
*H01M 50/20* (2021.01)

(52) U.S. Cl.
CPC ........ *H01M 50/20* (2021.01); *H01M 2220/20* (2013.01)

(58) Field of Classification Search
CPC .................................................. H01M 50/20
See application file for complete search history.

(56) References Cited

U.S. PATENT DOCUMENTS

| 7,654,352 | B2 | 2/2010 | Takasaki et al. |
| 9,034,502 | B2 | 5/2015 | Kano et al. |
| 2011/0070478 | A1* | 3/2011 | Meschter .......... H01M 10/0525 429/159 |
| 2014/0014428 | A1 | 1/2014 | Yanagi |

FOREIGN PATENT DOCUMENTS

CN    108657559 A    10/2018

OTHER PUBLICATIONS https://fixmyev.com/v1/tesla/models/servicemanual/tmsr-Z7kka7ZW8i.html 6/.

* cited by examiner

*Primary Examiner* — Olatunji A Godo
(74) *Attorney, Agent, or Firm* — David B. Kelley; Carlson, Gaskey & Olds, P.C.

(57) ABSTRACT

An apparatus and method, according to an exemplary aspect of the present disclosure includes, among other things, a battery tray configured to support a plurality of battery cells and at least one cross member positioned between adjacent battery cells. The at least one cross member comprises a base portion that is fixed to the battery tray and an elongated body extending outwardly from the base portion. The elongated body extends from a first end at the base portion to a second end that is opposite the first end, and wherein the first end has a first width and the second end has a second width that is less than the first width.

22 Claims, 3 Drawing Sheets

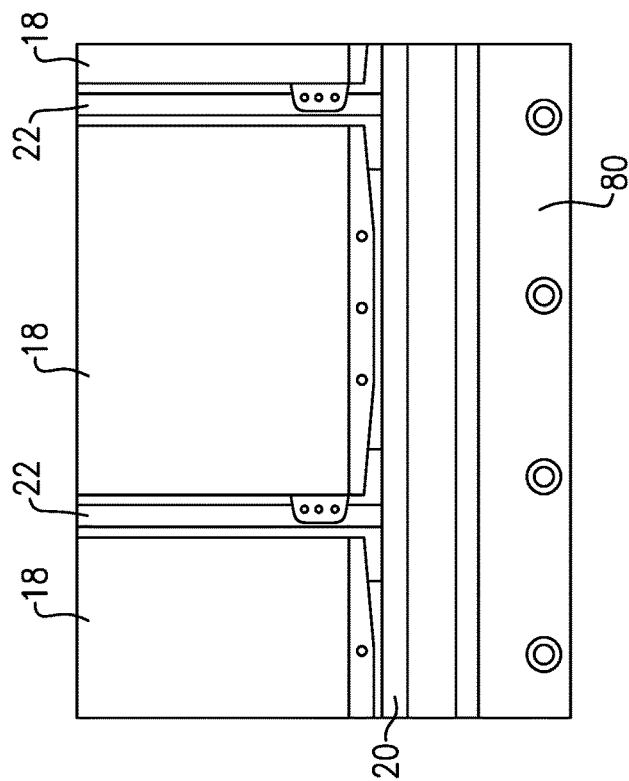
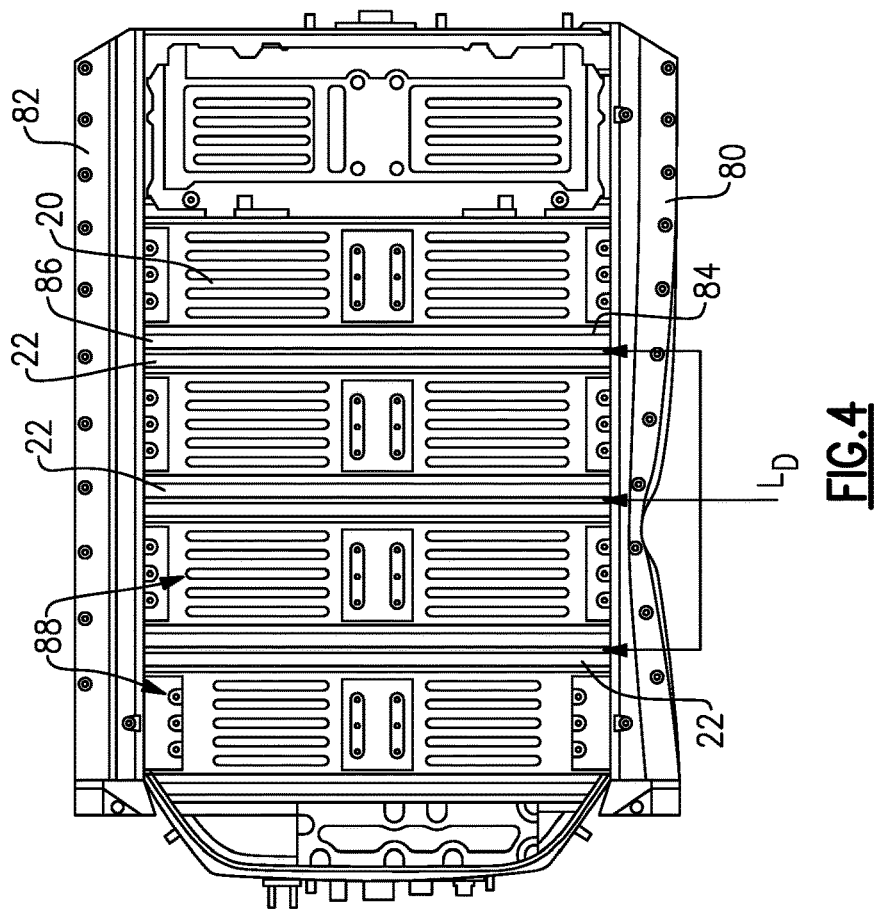

BATTERY STRUCTURE COMPRISING TRAY AND CROSS MEMBERS

TECHNICAL FIELD

This disclosure relates generally to a battery array that includes a tray and cross members to provide a battery support structure for a vehicle that is powered by an electric machine.

BACKGROUND

A high voltage battery pack for powering electric machines and other electrical loads typically includes multiple battery assemblies, or battery arrays, that include a plurality of interconnected battery modules comprised of battery cells. The battery cells are located within an enclosure or support structure for protection from high load events.

SUMMARY

An apparatus according to an exemplary aspect of the present disclosure includes, among other things, a battery tray configured to support a plurality of battery cells and at least one cross member positioned between adjacent battery cells. The at least one cross member comprises a base portion that is fixed to the battery tray and an elongated body extending outwardly from the base portion. The elongated body extends from a first end at the base portion to a second end that is opposite the first end, and wherein the first end has a first width and the second end has a second width that is less than the first width.

In a further non-limiting embodiment of the foregoing apparatus, the base portion comprises a raised center portion that is spaced apart from an upper surface of the battery tray by a gap, a first flange portion is on one side of the raised center portion, and a second flange portion is on an opposite side of the raised center portion, the first and second flange portions being in direct contact with the upper surface of the battery tray.

In a further non-limiting embodiment of any of the foregoing apparatus, the battery tray comprises a single-piece structure that extends underneath the base portion and the first and second flange portions.

In a further non-limiting embodiment of any of the foregoing apparatus, a plurality of fasteners attach the first and second flange portions to the battery tray.

In a further non-limiting embodiment of any of the foregoing apparatus, the plurality of fasteners comprise self-piercing rivets.

In a further non-limiting embodiment of any of the foregoing apparatus, the battery tray includes a depression that is positioned underneath the raised center portion.

In a further non-limiting embodiment of any of the foregoing apparatus, the base portion includes a first wall that transitions from the first flange portion to the raised center portion and a second wall that transitions from the second flange portion to the raised center portion, and wherein the depression has a width that extends from the first wall to the second wall.

In a further non-limiting embodiment of any of the foregoing apparatus, the elongated body comprises a first wall extending from the first end to the second end of the elongated body, a second wall spaced apart from the first wall by an open gap and extending from the first end to the second end of the elongated body, and a top wall that connects the first and second walls together, and wherein the first and second walls are spaced apart from each other by a greater distance at the first end than at the second end.

In a further non-limiting embodiment of any of the foregoing apparatus, the top wall has a greater thickness than the first wall and the second wall.

In a further non-limiting embodiment of any of the foregoing apparatus, the raised center portion connects the first wall to the second wall to form a closed section for the elongated body between the raised center portion, top wall, and first and second walls.

In a further non-limiting embodiment of any of the foregoing apparatus, a cross wall extends between the first and second walls.

In a further non-limiting embodiment of any of the foregoing apparatus, the at least one cross member comprises a plurality of cross members wherein one cross member is positioned between each pair of adjacent battery cells, and including first and second side rails where one end of each cross member is fixed to the first side rail and an opposite end of each cross member is fixed to the second side rail.

In a further non-limiting embodiment of any of the foregoing apparatus, the battery tray comprises a single-piece structure that extends underneath the plurality of cross members.

An apparatus, according to yet another exemplary aspect of the present disclosure includes, among other things, a plurality of battery cells, a battery tray comprising a single piece-structure that supports the plurality of battery cells, and a plurality of cross members wherein one cross member is positioned between each pair of adjacent battery cells. Each cross member comprises a base portion that is fixed to the battery tray and an elongated body extending outwardly from the base portion. The elongated body comprises first and second walls that extend from a first end at the base portion to a second end that is opposite the first end, and a top wall that connects the second ends of the first and second walls. The first and second walls are spaced apart from each other by a first width at the first ends and the first and second walls are spaced apart from each other by a second width at the second ends that is less than the first width.

In a further non-limiting embodiment of any of the foregoing apparatus, the base portion comprises a raised center portion that is spaced apart from an upper surface of the battery tray by a gap, a first flange portion on one side of the raised center portion, and a second flange portion on an opposite side of the raised center portion, the first and second flange portions being in direct contact with the upper surface of the tray.

In a further non-limiting embodiment of any of the foregoing apparatus, the battery tray extends underneath the base portion and the first and second flange portions.

In a further non-limiting embodiment of any of the foregoing apparatus, a plurality of fasteners attach the first and second flange portions to the tray.

In a further non-limiting embodiment of any of the foregoing apparatus, the tray includes a depression that is positioned underneath the raised center portion.

In a further non-limiting embodiment of any of the foregoing apparatus, the base portion includes a first vertical wall that transitions from the first flange portion to the raised center portion and a second vertical wall that transitions from the second flange portion to the raised center portion, and wherein the depression has a width that extends from the first vertical wall to the second vertical wall.

A method according to still another exemplary aspect of the present disclosure includes, among other things, forming a battery tray as a single piece-structure that supports a plurality of battery cells, and providing a plurality of cross members wherein one cross member is positioned between each pair of adjacent battery cells. Each cross member comprises a base portion that is fixed to the battery tray and an elongated body extending outwardly from the base portion. The elongated body comprises first and second walls that extend from a first end at the base portion to a second end that is opposite the first end, and a top wall that connects the second ends of the first and second walls. The first and second walls are spaced apart from each other by a first width at the first end and the first and second walls are spaced apart from each other by a second with at the second end that is less than the first width.

The embodiments, examples and alternatives of the preceding paragraphs, the claims, or the following description and drawings, including any of their various aspects or respective individual features, may be taken independently or in any combination. Features described in connection with one embodiment are applicable to all embodiments, unless such features are incompatible.

BRIEF DESCRIPTION OF THE FIGURES

The various features and advantages of the disclosed examples will become apparent to those skilled in the art from the detailed description. The figures that accompany the detailed description can be briefly described as follows:

FIG. 4 is a top view of a battery tray configured to support a plurality of battery cells and cross members.

FIG. 5 is an enlarged view of a cross member connection interface.

DETAILED DESCRIPTION

This disclosure details an exemplary battery array that includes a tray and cross members to provide a battery support structure for a vehicle that is powered by an electric machine.

Figure 1:
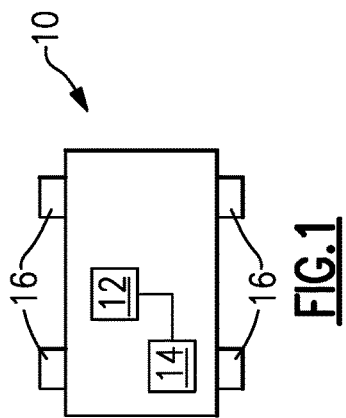
FIG. 1 is a schematic illustration of one example of an electrified vehicle.

FIG. 1 schematically illustrates an example electrified vehicle 10 that includes a battery 12, an electric machine 14, and wheels 16. The electric machine 14 can receive electric power from the battery 12. The electric machine 14 converts the electric power to torque that drives the wheels 16. The battery 12 is a high voltage traction battery in some embodiments.

The example electrified vehicle 10 is an all-electric vehicle, i.e. a battery electric vehicle (BEV). In other examples, the electrified vehicle 10 is a hybrid electric vehicle or plug-in hybrid electric vehicle (PHEV), which can selectively drive the wheels 16 with torque provided by an internal combustion engine instead of, or in addition to, the electric machine.

Figure 2:
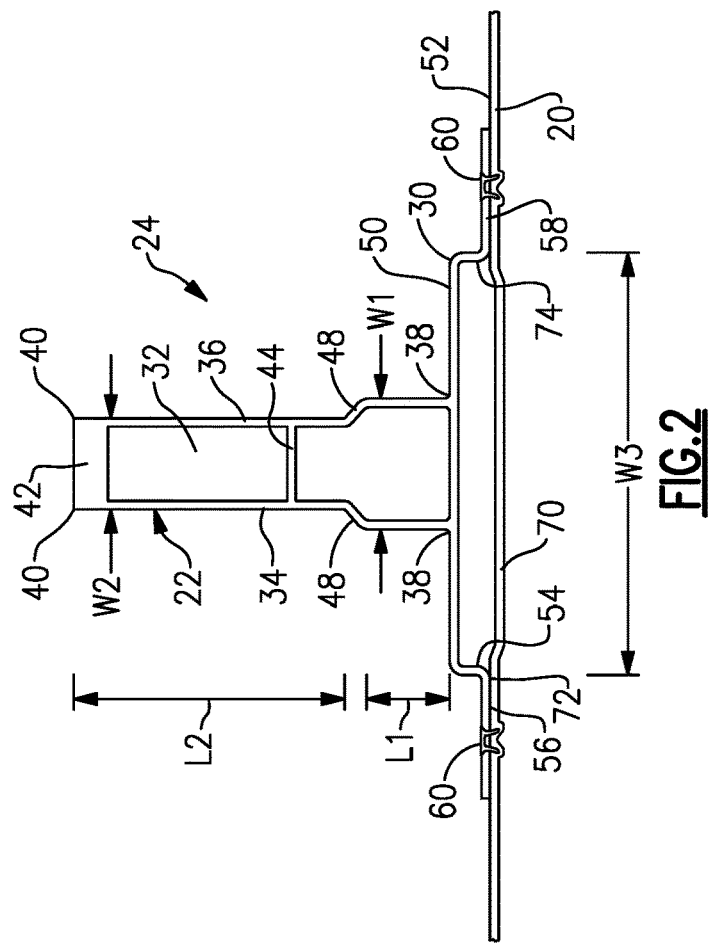
FIG. 2 is a section view of a support structure for a plurality of battery cells.

The battery 12 is an exemplary electrified vehicle battery. As shown in FIG. 5, the battery 12 may be a high voltage traction battery pack that includes a plurality of battery assemblies (i.e., battery arrays or groupings of battery cells) 18 capable of outputting electrical power to operate the electric machine 14. The battery cells 18 include a support structure 24 for protection purposes as shown in FIG. 2.

The support structure 24 includes a battery tray 20 that comprises a single piece-structure that supports the plurality of battery cells 18. In one example, the support structure 24 further includes a plurality of cross members 22 wherein one cross member 22 is positioned between each pair of adjacent battery cells 18. Optionally, cross members 22 could be between two pairs of adjacent battery cells 18 or in other arrangements. Each cross member 22 comprises a base portion 30 that is fixed to the battery tray 20 and an elongated body 32 extending outwardly from the base portion 30. The elongated body 32 comprises first 34 and second 36 walls that extend from a first end 38 at the base portion 30 to a second end 40 that is opposite the first end 38 and a top wall 42 that connects the second ends 40 of the first 34 and second 36 walls. The first 34 and second 36 walls are spaced apart from each other by a first width W1 at the first ends 38 and the first 34 and second 36 walls are spaced apart from each other by a second width W2 at the second ends 40 that is less than the first width W1. The walls 34, 36 are spaced apart from each other by an open space such that the cross member 22 has reduced weight as compared to a solid body.

In one example, the cross member 22 includes a cross wall 44 that extends between the first 34 and second 36 walls to provide for increased strength and stiffness. Transition wall portions 48 taper inwardly to connect the wider portion to the narrower portion of the elongated body structure 32. This wider spacing at the bottom provides for increased stiffness. The first width W1 extends along a first length L1 of the elongated body 32 and the second width W2 extends along a second length L2 of the elongated body 32. In one example, the first length L1 is less than the second length L2. In one example, the second length L2 is at least twice as long as the first length L1. In one example, the cross wall 44 is located closer to the wider portion than to the top wall 42.

In one example, the top wall 42 has a greater thickness in the vertical direction than a thickness of the first 34 and second 36 walls in the longitudinal direction. This increased thickness forms a solid area at the top of the cross member 22, with the open section area of the elongated body 32 extending from the solid area to the cross wall 44 and then to the base portion 30. This increased thickness facilitates reduction of vibrations and facilitates handling high loads that are applied in a vertical direction.

In one example, the base portion 30 comprises a raised center portion 50 that is spaced apart from an upper surface 52 of the battery tray 20 by a gap 54. A first flange portion 56 extends along one side of the raised center portion 50 and a second flange portion 58 extends along an opposite side of the raised center portion 50. The first 56 and second 58 flange portions are in direct abutting contact with the upper surface 52 of the tray 20. The raised center portion 50 connects the first ends 38 of the first 34 and second 36 walls to form a closed section for the elongated body 32. The closed section surrounds an open area that is enclosed between the raised center portion 50, the top wall 42, and the first 34 and second 36 walls.

The battery tray 20 extends underneath the base portion 30 and the first 56 and second 58 flange portions. A plurality of fasteners 60 are used to attach the first 56 and second 58 flange portions to the tray 20. In one example, the plurality of fasteners comprises a plurality of self-piercing rivets.

In one disclosed example, the tray 20 includes a depression 70 that is positioned underneath the raised center portion 50. The base portion 30 includes a first vertical wall 72 that transitions from the first flange portion 56 to the raised center portion 50 and a second vertical wall 74 that transitions from the second flange portion 58 to the raised center portion 50. The depression 70 has a width W3 that extends substantially from the first vertical wall 72 to the second 74 vertical wall. This provides additional stiffness to the support structure 24.

FIG. 4 shows first 80 and second 82 side rails that respectively extend along opposite sides of the battery support structure. Between each pair of adjacent battery cells 18, there is one cross member 22. The cross members 22 extend across a width of the tray 20 such that one end 84 of each cross member 22 is fixed to the first side rail 80 and the opposite end 86 of each cross member 22 is fixed to the second side rail 82. Open areas 88 adjacent the cross members 22 are to receive a battery cell 18 (see FIG. 5). In the occurrence of a high load input event, there is a more even load distribution $L_D$ (see FIG. 4) across the cross members 22 as compared to prior configurations. As such, the cross members absorb the input loads and reduce the potential for contact of the side rails 80, 82 against the battery cells 18.

Figure 3:
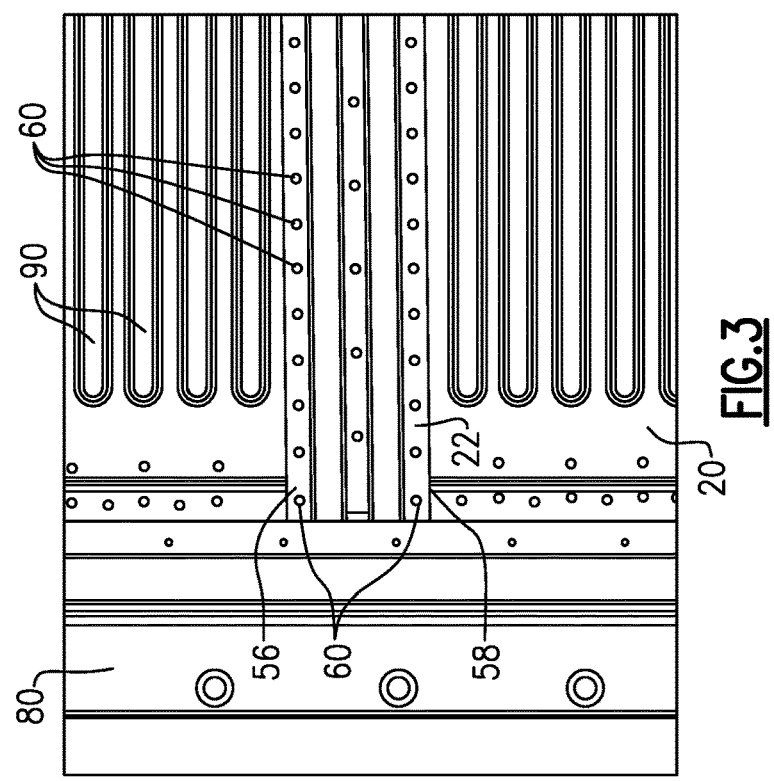
FIG. 3 is a top view of the tray and cross member of FIG. 2 as connected to a side rail.

FIG. 3 shows an example of a connection interface between the cross-member 22 and the side rail 80. One or more of the fasteners 60 connect the first 56 and second 58 flanges to the side rail 80. The fasteners 60 also connect the flanges 56, 58 to the tray 20. Also shown in FIG. 3, in one example, the tray 20 includes additional depressions 90 on the upper surface 52 of the tray 20. These additional depressions 90 further increase stiffness of the tray 20 and are located in areas that are to receive the battery cells 18.

Figure 6:
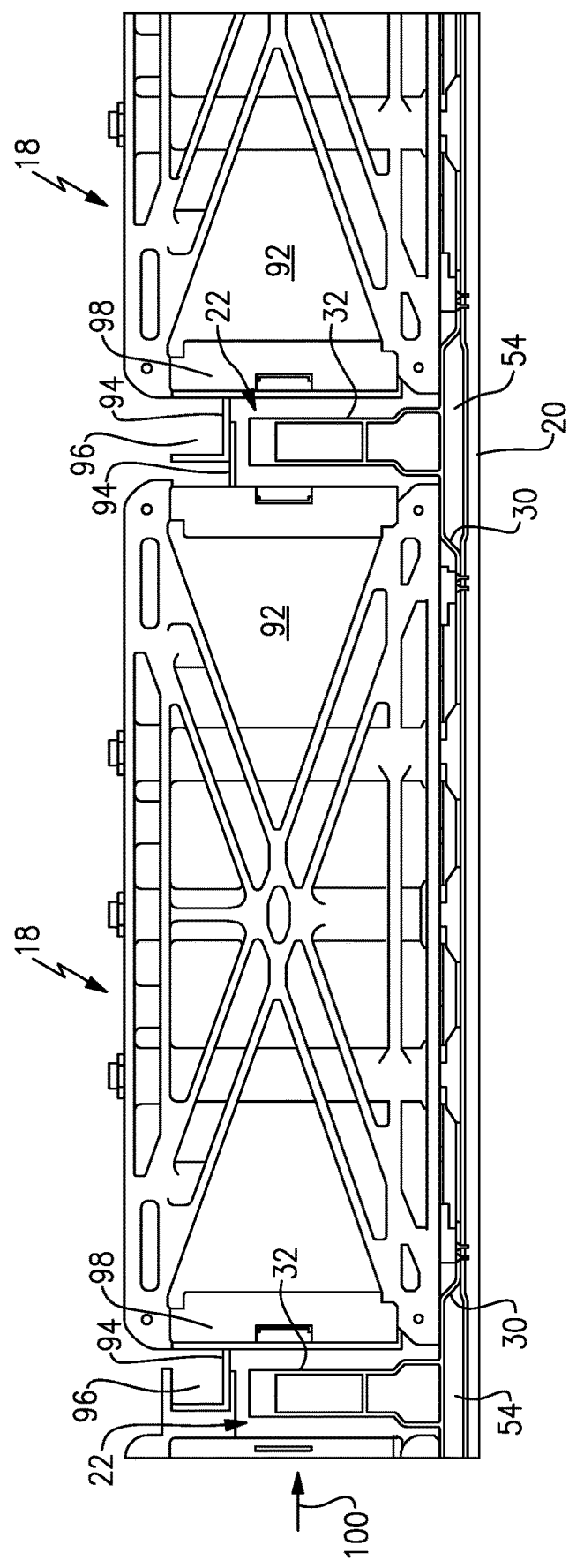
FIG. 6 is side view of a battery tray supporting a plurality of battery cells and cross members.

FIG. 6 shows cross members 22 between adjacent battery cells 18 that are covered by a plate 92. The battery cells 18 are connected to each other via tabs 94 as known. The tabs 94 include connectors 96 for connection to a wiring harness or other electrical hardware. Busbars 98 are positioned at ends of the battery cells 18 and are associated with the tabs 94. The elongated body 32 with the widened bottom and the base portion 30 of the cross member 22 cooperate with the single-piece tray 20 to improve energy absorption and prevent interaction with the busbars 98 and cells 18 due to forces in the axial direction as indicated at 100 in FIG. 6.

Battery cells, energy distribution system (EDS), and other hybrid/electrified vehicle components are to be protected during high load events to avoid transferring loads to battery internals. The disclosed battery support structure 24 provides a cross member design with a wider base compared to prior configurations having a constant cross-section, which improves bending stiffness and ability to withstand high load events in the x and y directions, i.e. in the longitudinal and lateral directions, (see FIGS. 2 and 4). Having a narrower section at the top of the cross members reduces weight and prevents interaction of the cross members with the arrays and busbars (see FIG. 6). Having a solid section at the top of the cross member 22 improves noise, vibration, and harshness (NVH) issues and further facilitates handling high loading in the z direction, i.e. vertical direction.

Further, the cross members 22 are integrated to the battery tray 20 for improved load path management. The disclosed support structure attaches the cross members to the battery tray using fasteners such as self-piercing rivets, for example. This creates a continuous structure as the battery tray is one-piece as opposed to being segmented as in prior configurations. Attaching the cross members 22 to the tray 20 provides a more even distribution of the load across the array brackets, tray, and cross members in the situation where the inertial load applied to the arrays is transferred to the array brackets, from the brackets to the tray, and from the tray to the cross members. Direct loads from external load events are also transferred directly to the cross members 22.

Although a specific component relationship is illustrated in the figures of this disclosure, the illustrations are not intended to limit this disclosure. In other words, the placement and orientation of the various components shown could vary within the scope of this disclosure. In addition, the various figures accompanying this disclosure are not necessarily to scale, and some features may be exaggerated or minimized to show certain details of a particular component.

The preceding description is exemplary rather than limiting in nature. Variations and modifications to the disclosed examples may become apparent to those skilled in the art that do not necessarily depart from the essence of this disclosure. Thus, the scope of legal protection given to this disclosure can only be determined by studying the following claims.

What is claimed is:

1. An apparatus, comprising:
a battery tray configured to support a plurality of battery cells; and
at least one cross member positioned between adjacent battery cells, wherein the at least one cross member comprises a base portion that is fixed to the battery tray and an elongated body extending outwardly from the base portion, wherein the elongated body extends from a first end at the base portion to a second end that is opposite the first end, and wherein the first end has a first width and the second end has a second width that is less than the first width, and wherein the first width extends along a first length of the elongated body and the second width extends along a second length of the elongated body where the first length is less than the second length.

2. An apparatus, comprising:
a battery tray configured to support a plurality of battery cells; and
at least one cross member positioned between adjacent battery cells, wherein the at least one cross member comprises a base portion that is fixed to the battery tray and an elongated body extending outwardly from the base portion, wherein the elongated body extends from a first end at the base portion to a second end that is opposite the first end, and wherein the first end has a first width and the second end has a second width that is less than the first width, and wherein the base portion comprises a raised center portion that is spaced apart from an upper surface of the battery tray by a gap, a first flange portion on one side of the raised center portion, and a second flange portion on an opposite side of the raised center portion, the first and second flange portions being in direct contact with the upper surface of the battery tray.

3. The apparatus according to claim 2, wherein the battery tray comprises a single-piece structure that extends underneath the base portion and the first and second flange portions.

4. The apparatus according to claim 3, including a plurality of fasteners that attach the first and second flange portions to the battery tray.

5. The apparatus according to claim 4, wherein the plurality of fasteners comprise self-piercing rivets.

6. The apparatus according to claim 3, wherein the battery tray includes a depression that is positioned underneath the raised center portion.

7. The apparatus according to claim 6, wherein the base portion includes a first wall that transitions from the first flange portion to the raised center portion and a second wall that transitions from the second flange portion to the raised center portion, and wherein the depression has a width that extends from the first wall to the second wall.

8. The apparatus according to claim 2, wherein the elongated body comprises a first wall extending from the first end to the second end of the elongated body, a second wall spaced apart from the first wall by an open gap and extending from the first end to the second end of the elongated body, and a top wall that connects the first and second walls together, and wherein the first and second walls are spaced apart from each other by a greater distance at the first end than at the second end.

9. The apparatus according to claim 8, wherein the top wall has a greater thickness than the first wall and the second wall.

10. The apparatus according to claim 8, wherein the raised center portion connects the first wall to the second wall to form a closed section for the elongated body between the raised center portion, top wall, and first and second walls.

11. The apparatus according to claim 8, including a cross wall extending between the first and second walls.

12. The apparatus according to claim 2, wherein the at least one cross member comprises a plurality of cross members wherein one cross member is positioned between each pair of adjacent battery cells, and including first and second side rails where one end of each cross member is fixed to the first side rail and an opposite end of each cross member is fixed to the second side rail.

13. The apparatus according to claim 12, wherein the battery tray comprises a single-piece structure that extends underneath the plurality of cross members.

14. An apparatus:
a plurality of battery cells;
a battery tray comprising a single piece-structure that supports the plurality of battery cells; and
a plurality of cross members wherein one cross member is positioned between each pair of adjacent battery cells, and wherein each cross member comprises a base portion that is fixed to the battery tray and an elongated body extending outwardly from the base portion, wherein the base portion comprises a raised center portion that is spaced apart from an upper surface of the battery tray by a gap, and wherein the elongated body comprises first and second walls that extend from a first end at the base portion to a second end that is opposite the first end and a top wall that connects the second end of each of the first and second walls, and wherein the first and second walls are spaced apart from each other by a first width at the first end and the first and second walls are spaced apart from each other by a second width at the second end that is less than the first width.

15. The apparatus according to claim 14, including a first flange portion on one side of the raised center portion, and a second flange portion on an opposite side of the raised center portion, the first and second flange portions being in direct contact with the upper surface of the tray.

16. The apparatus according to claim 15, wherein the battery tray extends underneath the base portion and the first and second flange portions.

17. The apparatus according to claim 15, including a plurality of fasteners that attach the first and second flange portions to the tray.

18. The apparatus according to claim 15, wherein the tray includes a depression that is positioned underneath the raised center portion.

19. The apparatus according to claim 18, wherein the base portion includes a first vertical wall that transitions from the first flange portion to the raised center portion and a second vertical wall that transitions from the second flange portion to the raised center portion, and wherein the depression has a width that extends from the first vertical wall to the second vertical wall.

20. A method comprising:
forming a battery tray as a single piece-structure that supports a plurality of battery cells; and
providing a plurality of cross members wherein one cross member is positioned between each pair of adjacent battery cells, and wherein each cross member comprises a base portion that is fixed to the battery tray and an elongated body extending outwardly from the base portion, wherein the elongated body comprises first and second walls that extend from a first end at the base portion to a second end that is opposite the first end and a top wall that connects the second end of each of the first and second walls, and wherein the first and second walls are spaced apart from each other by a first width at the first end and the first and second walls are spaced apart from each other by a second width at the second end that is less than the first width, and wherein the first width extends along a first length of the elongated body and the second width extends along a second length of the elongated body where the first length is less than the second length.

21. The method according to claim 20, wherein the base portion comprises a raised center portion that is spaced apart from an upper surface of the battery tray by a gap.

22. The apparatus according to claim 14, wherein the first width extends along a first length of the elongated body and the second width extends along a second length of the elongated body where the first length is less than the second length.

* * * * *